United States Patent Office 3,666,461
Patented May 30, 1972

3,666,461
POLYMERIC MASTER PLATE AND METHOD
Clifton L. Kehr, Silver Spring, and Walter R. Wszolek, Sykesville, Md., and Frank X. Weber, Ridgewood, N.J., assignors to W. R. Grace & Co., New York, N.Y.
No Drawing. Continuation-in-part of application Ser. No. 674,773, Oct. 12, 1967. This application Dec. 10, 1969, Ser. No. 883,998
The portion of the term of the patent subsequent to Oct. 19, 1989, has been disclaimed
Int. Cl. G03c 5/00, 1/68
U.S. Cl. 96—35.1
2 Claims

ABSTRACT OF THE DISCLOSURE

The invention disclosed is for a method of preparing a polymeric master plate having high physical strength and hardness characteristics by using a photocurable composition formed of a particular polyene complex containing at least two -ene or -yne functionality groups per molecule; and a polythiol. The polymeric master plate is prepared by selectively insolubilizing portions of the photocurable composition by exposure to actinic radiation after which uncured portions of the composition are removed from the insolubilized portions to provide ultimately a master plate useful for duplicating printing plates. A new, efficient method for preparing printing plates using the present polymeric master plate is also disclosed.

---

The present application for United States Letters Patent is a continuation-in-part of application Ser. No. 674,773 filed Oct. 12, 1967.

This invention relates to a method for preparing a polymeric master plate useful in a new, efficient method for duplicating printing plates. The present master plate having high physical strength and hardness characteristics is prepared from a photocurable composition which includes a particular polyene complex containing at least two -ene or -yne functionality groups per molecule; and a polythiol. The polymeric master plate is prepared by selective photocuring followed by removal of uncured portions of the composition.

It is standard practice to print newspapers from metal printing plates formed of lead alloy. Relatively recently it has been found that improved printing plates may be manufactured using thermoplastic resins in place of lead alloy. Such thermoplastic resin printing plates are more desirable than lead alloy plates because of the lighter weight of the plastic and the sharper definition in printing that can be achieved with plastic.

Lead alloy plates are conventionally cast by stereotype mats which consist of a sheet of resin-impregnated, felted cellulose fibers which may be composed of rag stock, cotton linters, wood fibers produced by chemical pulping processes, or the like.

After a mat has been prepared, it appears in a moistened, plastic condition. The stereotype mat is pressed down against a metallic form or pattern which may be an assembly of Linotype characters, photoengravings, or the like arranged in a desired final configuration of a printed newspaper page. The relatively damp impression-imaged mat is then formed into a semi-circular shape by mounting about a semi-circular element and is hardened and dried.

After the mat has been dried and hardened, the face containing the imaged impression is adapted to impart an accurate reproduction to a printing plate which is cast against the mat. Conventionally, the reproduction is made by casting molten alloy metal against the face of the mat in a casting box and subsequently allowing the metal to cool and solidify.

It has now been found by the method of the present invention that a polymeric master plate may be prepared and used in place of a metallic pattern against which a mat is cast. The present polymeric plate thus provides a simple, inexpensive and high quality duplication means for preparing printing plates employing a stereotype matrix.

Generally stated, the present invention provides a method for preparing a polymeric master plate having high physical strength and hardness characteristics by using a photocurable composition formed of a particular polyene complex having an -ene or -yne functionality of at least two and having a molecular weight ranging from about 150 to about 20,000 or more and a viscosity in the range from slightly above 0 to about 20 million centipoises at 70° C. as measured by a Brookfield viscometer. The polyene may be exemplified and characterized as the reaction products of either (A) an organic epoxide containing at least two

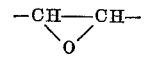

groups in its structure with a member of the group consisting of hydrazine, a primary amine, secondary amine, tertiary amine salt, organic alcohol and organic acid wherein said group members contain at least one organic substituent containing a reactive ethylenically or ethynically unsaturated group; or (B) an organic epoxide containing at least one organic substituent having a reactive ethylenically or ethynically unsaturated group with a member of the group consisting of hydrazine and an organic material containing at least two active hydrogen functions from the group consisting of

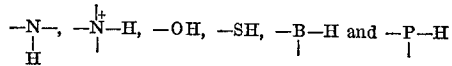

The polyenes are combined with a polythiol to form a combination which upon exposure to actinic radiation is photocured and upon further processing provides a polymeric master plate having high physical strength and hardness characteristics.

The presently prepared master plate provides a useful means for duplicating printing plates by serving as a mold for a stereotype mat such as one formed of resin-impregnated cellulose fibers. The stereotype mat, after being molded by the present master plate, is stripped therefrom and after being hardened and dried provides a mold into which may be cast a lead alloy, rubber or plastic as desired. The present master plate provides an efficient means for duplicating printing plates in a simple, low cost, rapid and effective manner in contrast to methods employed heretofore.

The present polymeric master plate may be initially formed by compounding a photocurable composition which includes a particular polyene complex containing at least two -ene or -yne functional groups per molecule, a polythiol and optionally a photo-initiator. The photocurable composition is deposited on a support layer to a substantially uniform height, and a transparency film is positioned over the supported layer of photocurable composition. From an actinic radiation source, light is projected through the transparency and onto the supported photocurable composition. Because the transparency includes substantially opaque and substantially transparent areas, projected actinic radiation is selectively screened onto the photocurable composition resulting in photocured areas and unphotocured areas. After exposure to actinic radiation, the uncured composition is removed by any convenient means such as etching, washing or the like and the developed plate is dried, if necessary, and thereafter finally exposed to actinic radiation to completely insure photocuring throughout the remaining areas which adhere to the support layer. The prepared plate, now appearing as a polymeric master plate, is used to effectively reproduce printing plates formed of metal, rubber, or plastic as herein described for use in printing of newspapers, books, magazines, films, foils, packaging materials and various miscellaneous other substrates.

In preparing printing plates, the present polymeric master plate serves as a mold about which is molded resin impregnated cellulose fibers conventionally employed in duplicating printing plates. The mat or matrix of cellulose fibers, after molding, is cured to form a rigid negative replica of the image on the surface of the master plate. After the matrix is stripped from the master plate, it effectively serves as a mold for preparing a printing plate of an alloy, rubber or plastic.

Polyene compositions useful herein have a multiplicity of -ene or -yne functionally groups and may be prepared, for example, by the reaction of oxirane groups, namely

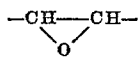

with ring-opening active hydrogen-containing species. A di- or polyfunctional epoxy compound may be reacted with an unsaturated active-hydrogen containing material, or alternatively, a di- or polyfunctional active hydrogen-containing compound may be reacted with an unsaturated epoxy material.

In greater detail, the polyene may be formed for example by the following equations:

(A)

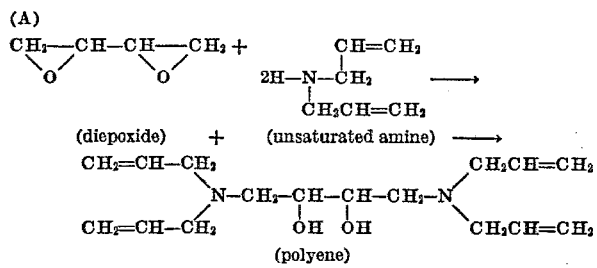

(B)

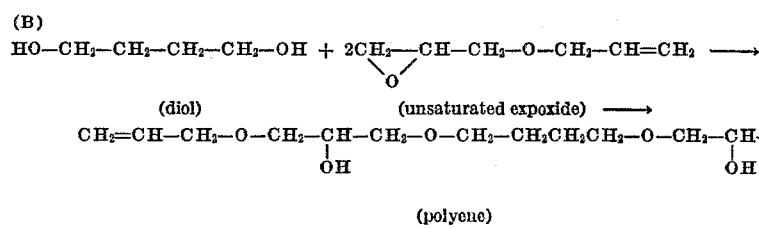

In the above equations the reactants may be of virtually any molecular weight (i.e., both monomeric or polymeric species). Further, the reactants may vary individually in functionality over a wide range, with an essential restriction being that the final -ene or -yne products have a functionality of at least two.

Polythiols useful herein are simple or complex organic compounds having a multiplicity of pendant or terminally positioned —SH functional groups per average molecule. On the average, polythiols must contain 2 or more —SH groups/molecule and usually have a viscosity range of slightly above 0 to about 20 million centipoises (cps.) at 70° C. as measured by a Brookfield viscometer. Polythiols include those materials which in the presence of an inert solvent, aqueous dispersant or plasticizer fall within the viscosity range set out above at 70° C. Operable polythiols in the instant invention usually have molecular weights in the range from about 50 to about 20,000, and preferably from about 100 to about 10,000.

Operable polythiols useful herein may be exemplified by the general formula: $R_8$—$(SH)_n$ where $n$ is at least 2 and $R_8$ is a polyvalent organic moiety free from reactive carbon-to-carbon unsaturation. Thus, $R_8$ may contain cyclic groupings and minor amounts of hereto atoms such as nitrogen, sulfur, phosphorus, or oxygen atoms but primarily contains carbon-hydrogen, carbon-oxygen, or silicon-oxygen chain linkages free of any reactive carbon to carbon unsaturation.

One class of polythiols usefully combined with polyenes to obtain essentially odorless polythioether products are esters of thiol-containing acids of the general formula: HS—$R_9$—COOH where $R_9$ is an organic moiety containing no "reactive" carbon-to-carbon unsaturation with polyhydroxy compounds of the general structure: $R_{10}$—$(OH)_n$ where $R_{10}$ is an organic moiety containing no "reactive" carbon-to-carbon unsaturation and $n$ is 2 or greater. These components react under suitable conditions to give a polythiol having the general structure:

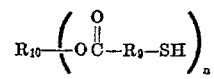

where $R_9$ and $R_{10}$ are organic moieties containing no "reactive" carbon-to-carbon unsaturation and $n$ is 2 or greater.

Certain polythiols such as the aliphatic monomeric polythiols (ethane dithiol, hexamethylene dithiol, decamethylene dithiol, tolylene-2,4-dithiol, and the like), and some polymeric polythiols such as thiol-terminated ethylcyclohexyl dimercaptan polymer, and similar polythiols which are conveniently and ordinarily synthesized on a commercial basis, although having obnoxious odors, are operable although many of the end products may not be accepted commercially because of odor.

Examples of the polythiol compounds preferred herein because of their relatively low odor level include but are not limited to esters of thioglycolic acid

β-mercaptopropionic acid (HS—CH($CH_3$)—COOH) and β-mercaptopropionic acid (HS—$CH_2CH_2$COOH) with polyhydroxy compounds such as glycols, triols, tetraols, pentaols, hexaols, and the like. Specific examples of the preferred polythiols include ethylene glycol bis (thioglycolate), ethylene glycol bis (β-mercaptopropionate), trimethylolpropane tris (thioglycolate), trimethylolpropane tris (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from poly (propylene ether glycol (e.g. Pluracol P2010, Wyandotte Chemical Corp.) and β-mercaptopropionic acid by esterification.

Preferred polythiol compounds are desirably characterized as having a low level of mercaptan-like odor initially, and after reaction, give essentially odorless polythioether end products.

The term "functionality" as used herein refers to the average number of -ene or thiol groups per molecule in the polyene or polythiol, respectively. For example, a triene is a polyene with an average of three "reactive" carbon-to-carbon unsaturated groups per molecule and thus has a functionality $(f)$ of three. A dithiol is a polythiol with an average of two thiol groups per molecule and thus has a functionality $(f)$ of two.

Although the functionality of the polyene and the polythiol components are commonly expressed in whole numbers, in practice the actual functionality may be fractional. For example, a polyene component having a nominal functionality of 2 (from theoretical considerations alone) may in fact have an effective functionality of somewhat less than 2. In an attempted synthesis of a diene from a diepoxide in which the reaction proceeds to 100% of the theoretical value for complete reaction, the functionality (assuming 100% pure starting materials) would be 2.0. If, however, the reaction were carried to only 90% of theory for complete reaction, about 10% of the molecules present would have only one -ene functional group, and there may be a trace of material that would have no -ene functional groups at all. Approximately 90% of the molecules, however, would have the desired diene structure and the product as a whole then would have an actual functionality of 1.9. Such a product may be useful herein and is referred to for convenience as having a functionality of 2.

To obtain the maximum strength, solvent resistance, creep resistance, heat resistance and freedom from tackiness, the reaction components consisting of the polyenes and polythiols are formulated in such a manner as to give solid, crosslinked, three dimensional network polythioether polymer systems on photocuring. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable.

In all the curable liquid systems herein the composition consists of about 2 to about 98 parts by weight of a polyene containing at leat 2 reactive unsaturated carbon-to-carbon bonds per molecule, and about 98 to about 2 parts by weight of a polythiol containing at least 2 thiol groups per molecule.

The photocurable composition may, if desired, include additives such as antioxidants, accelerators, dyes, inhibitors, activators, fillers, pigments, anti-static agents, flame-retardant agents, light scattering agents, thickeners, thixotropic agents, surface-active agents, viscosity modifiers, extending oils, plasticizers, tackifiers and the like. These additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like, and may be present in quantities up to 500 parts or more per 100 parts polymer by weight and preferably about 0.0005 to about 300 parts by weight on the same basis.

Curing rate inhibitors which may be added to the photocurable composition include by way of example, hydroquinone; p - tert - butyl catechol; 2,6-ditert-butyl-p-methylphenol; phenolthiazine; N-phenyl - 2 - naphthyl-amine; inert gas atmospheres such as helium, argon, nitrogen, and carbon dioxide; vacuum; and the like.

The photocurable composition may be initiated by actinic radiation which disassociates or abstracts the hydrogen atom from the SH group (or accomplishes the equivalent thereof) and which is operable under ambient conditions. Thus, it is possible to merely expose the polyene and polythiol admixture to actinic radiation, such as ultraviolet light, for preparing the present master plates. High energy radiation such as X-rays, α-rays, electron beams, gamma radiation, and the like may also be used in place of ultraviolet radiation.

Actinic radiation from any source may be used for photocuring. Various sources include carbon arcs, mercury arcs, fluorescent lamps with special ultraviolet light emitting phosphors, xenon arcs, argon glow lamps, and photographic flood lamps. Of these, the mercury vapor arcs, particularly the sun-lamp type, and the xenon arcs are very useful. The sun-lamp mercury vapor arcs are customarily used at a distance of 7 to 10 inches from the photocurable layer, whereas the xenon arc is placed at a distance of 24 to 40 inches from the photocurable layer. With a more uniformly extended source of low intrinsic brilliance, such as a group of contiguous fluorescent lamps with special phosphors, the plate may be exposed within an inch of the lamps.

It is preferred that the radiation emanate from a point source or in the form of parallel rays but divergent beams are also operable. Furthermore, it has been found preferable, particularly when the photocurable system is a liquid, to maintain an air gap between the photocurable composition and the image-bearing transparency. Such an air gap may range from about 0.1 to 250 mils or more. The air gap facilitates removal of the image-bearing transparency from the vicinity of the cured composition after exposure to actinic light without defacing the cured composition. However, contact between the image-bearing transparency and the photocurable composition, even if liquid, is operable. Thus, a standard photographic vacuum or simple glass plate may be used to maintain relative positioning between the image-bearing transparency and the photocurable composition. A parting layer disposed between the transparency and the photocurable composition may be used and may consist of a petrolatum or silicone film.

When the light source is relatively close to the image-bearing transparency, the light rays passing through the clear areas of the transparency enter as divergent beams into the photocurable layer and thus irradiate a continually diverging area in the photocurable layer beneath the clear portion of the transparency. This results in the formation of a truncated frustum of a cured polymer relief with smooth sloping sides which is at its greatest width at the bottom surface of the cured layer. The top surface of the relief is of substantially the same dimension as the clear area of the transparency. Such tapered relief may also be obtained by the use of oblique light beams from sources arranged around the periphery of the exposed area and by rotating the photocurable layer during exposure to equalize the distribution of light during exposure on all portions of the negative.

To obtain a top surface of substantially the same dimension as the clear area of the transparency and wide tapered relief when using a point light or collimated light source with an air gap between the image-bearing transparency and the photocurable composition, it is desirable to add light-scattering, finely divided, reflective particles to the photocurable composition. Both organic and inorganic fillers such as silicas, aluminas, sucrose, succinamide, etc. may be used.

The curing reaction may be initiated also by actinic radiation from sunlight or from special light sources which emit sufficient amounts of UV light. Thus it is possible merely to expose the polyene and polythiol admixture to actinic radiation under ambient conditions or otherwise and obtain a cured solid plastomeric or resinous product useful as a master printing plate material after development.

Chemical photocuring rate sensitizers may be included such as benzophenone, acetophenone, acenaphthene-quinone, methyl ethyl ketone, Thioxanthen-9-one, xanthen-9-one, 7-H-Benz [de] anthracen-7-one, dibenzosuberone, 1-naphthaldehyde, 4,4'-bis (dimethylamino) benzophenone, fluorene-9-one, 1'-acetonaphthone, 2'-acetonaphthone, 2,3-butanedione, anthraquinone 1-indanone, 2-tert-butyl anthraquinone, valerophenone, hexanophenone, 8-phenylbutyrophenone, p-morpholinopropiophenone, 4-morpholinobenzophenone, 4' - morpholinodeoxybenzoin, p-diacetylbenzene, 4-aminobenzophenone, 4'-methoxyacetophenone, benzaldehyde, α - tetralone, 9 - acetylphenanthrene 2-acetylphenanthrene, 10-thioxanthenone, 3-acetylphenanthrene, 3-acetylindole, 1,3,5-triacetylbenzene, and the like and blends thereof, to greatly reduce the exposure times. When these materials are used in conjunction with various forms of energetic radiation they yield very rapid, commercially practical cures. Curing rate sensitizers are usually added in an amount ranging from about 0.0005 to about 10% by weight of the photocurable composition.

A master plate may be prepared by exposing the photocurable composition to actinic radiation projected through an image-bearing line or half-tone positive or negative transparency, stencil, or the like consisting solely of substantially opaque or substantially transparent areas wherein the opaque areas are substantially of the same optical density. For convenience, the present photocurable composition is disposed on a support sheet prior to photocuring. The support sheet may be any natural or synthetic material in film, sheet, or plate form and may be flexible or rigid, reflective or non-reflective of actinic radiation. Metals, because of their greater strength in thinner form, are preferably employed as a support. However, where weight is critical, plastic, paper or rubber is employed as the support. Additionally, the support layer may be formed of the present photocurable composition. That is, a portion of the photocurable composition may be poured into a mold and exposed directly to actinic radiation to solidify the entire layer of the photocurable composition. After solidification, this layer serves as a support for additional photocurable composition poured thereon, which additional composition forms the relief after exposure through an image bearing transparency to actinic radiation.

A light absorptive layer disposed intermediate a light-reflective support and the photocurable composition may be used if required. Suitable light absorptive materials include various forms of iron oxide, lead chromate, lead molybdate, cadmium yellow or red, chromium green, iron blue, manganese black, various carbon blacks, and the like.

It is important to select a correct exposure time in photocuring. The exposure time must be sufficient to harden the photocurable composition in the exposed image areas without causing significant curing in the non-image areas. Aside from exposure time and light intensity, the extent of the exposure is dependent on the thickness of the photocurable layer, the curing temperature, the polyene and polythiol employed, the photoinitiator curing rate accelerator, the presence of light absorbing pigments or dyes in the photocurable composition, and the character of the image to be reproduced. In general, the thicker the layer to be cured, the longer the exposure time.

It has been observed that photocuring starts at the surface of the photocurable layer closest to the light source and proceeds downward to the support. With insufficient exposure, the layer may have a hard cure at the surface but, through lack of a clear-through cure, the relief will be removed when the unexposed area is removed. Inasmuch as the curing rate usually increases at higher temperatures, less exposure is required thereat than at room temperature. Thus ultraviolet light sources that emit heat are more efficient than cold ultraviolet light sources. However, care must be exercised that too high a temperature is not attained during the photocure, as this leads to, in some cases, thermal expansion of the photocurable composition which results in image distortion. Hence, it is preferred that the photocuring be carried out at a temperature in the range of about 20 to about 70° C.

After photocuring, the plate having cured and uncured areas is developed by removing the uncured composition from the unexposed non-image areas. A suitable solvent may be employed to develop the plate by dissolving or dispersing the liquid uncured composition. The photocurable composition may be readily removed by vigorous washing with solvent and/or mechanical means, and possibly with the use of high temperature treatments. Generally, solvent washing may be effected in about 5 minutes in an ultrasonic activated solvent bath.

After developing, the plate may be further exposed to actinic radiation to insure final curing of the composition. The finally cured plate desirably has a surface hardness of at least 80, Shore A scale, in the photocured areas.

Practice of the present invention is further illustrated but not limited by the following examples wherein all parts are by weight unless otherwise indicated.

EXAMPLE 1

A liquid photocurable composition was prepared by blending 100 parts by weight of a polyene reaction product of two molar parts of diallyl amine per molar part of "Epon 828," a trademarked product by Shell Chemical Co. for a diglycidyl ether of Bisphenol A having a molecular weight of about 370 to about 384; 50 parts by weight of pentaerythritol tetrakis ($\beta$-mercaptopropionate) as a polythiol; and 0.6 part by weight of benzophenone sensitizer. This liquid photocurable composition having a viscosity of 25,000 centipoises at 70° C. as measured with a Brookfield viscometer, was poured, at a temperature of about 70° C., onto a 4 mil thick plastic support film having a 35 mil thick frame disposed about the edges of the support film forming a mold. The liquid photocurable composition was distributed evenly to a substantially level surface of uniform thickness. An image-bearing negative was next positioned with an air gap of about 7 mils over the liquid photocurable composition. Actinic radiation from a 4000 watt xenon arc lamp placed about 30 inches above the negative was thereafter projected through the transparent areas of the negative onto the liquid photocurable composition. The photocurable composition was exposed for two minutes during which time the liquid photocurable composition gelled in the image areas. The non-image areas remained liquid of essentially the same viscosity as before exposure. After exposure the negative and the uncured portion of the photocurable composition was etched away by immersing the plate in an ultrasonically activated solvent bath for about 5 minutes. The plate was next dried and found to be sufficiently hard and not require further exposure to actinic radiation for final hardening. The photocurable composition in the image areas was observed to have gelled all the way through to the support film, producing a line and half-tone image having a relief thickness of 35 mils. The overall plate thickness was 39 mils. The surface of the non-image areas of the plate was the support film. The relief image adhered well to the support film and was not removed by the etching operation. On examination, the plate was found to have a Shore A hardness of about 85.

The plate was placed in a Lake Erie direct pressure molding machine and covered with a cellulose mat material which was thereby molded into a printing mat at about 25° C. using a pressure of about 2500 p.s.i. for 15 seconds. The mat was next removed, dried and formed in a mat scorching machine. The thus formed, dried, and hardened mat was found to have a very high quality image useful as a negative for reproduction of printing plates having good detail.

The mat was placed in a casting box and led stereotype duplicate printing plates were cast therein. Printing using these duplicate plates provided high quality reproductions having sharp resolution in both the half-tone areas and line areas.

EXAMPLE 2

The polymeric master plate prepared in Example 1 was placed in contact with a cellulose mat material of the type used in that example. The plate and the mat material were passed through the nip of a Goss Giant mat roller machine, wherein the mat material was molded into a printing mat at about 25° C. using a pressure of about 3500 p.s.i. at the nip. This mat was dried and formed using the mat scorching machine of Example 1. Lead stereotype duplicate printing plates and printed reproductions were prepared using this mat and the duplicate plate forming and printing procedures of Example 1. The quality of these printed reproductions was found to be comparable to the reproductions of the previous example.

EXAMPLE 3

A printing mat was molded from the Example 1 polymeric master plate using the mat molding procedure of Example 1 with the exception that in this example the mat was molded under a pressure of 3750 p.s.i. Stereotype duplicate printing plates and printed reproductions thereof were prepared using this mat and the plate casting and printing procedures of Example 1. The quality of these printed reproductions was observed to be comparable to the reproductions of Example 1.

EXAMPLE 4

The procedure of Example 1 was repeated with the exception that the photocurable composition included allyl amine in place of diallyl amine, with replacement on an equimolar basis. This photocurable composition was found to have a viscosity of about 22,000 centipoises at 70° C. as measured by a Brookfield viscometer. The photocured polymeric master plate thus formed was found to have a hardness of about 80 on the Shore A scale. The printed reproductions ultimately formed using this master plate in accordance with the procedure of Example 1 were all found to be of substantially the same quality as the printed reproductions of that example.

EXAMPLE 5

The procedure of Example 1 was repeated with the exception that the polyene component of the photocurable composition was the reaction product of 5,6-epoxy 1-hexene with propylene glycol in a 2:1 molar ratio. This photocurable composition was found to have a viscosity of about 10,000 centipoises at 70° C. as measured by a Brookfield viscometer. The photocured polymeric master plate thus formed was found to have a hardness of about 85 on the Shore A scale. The printed reproductions ultimately formed using this master plate in accordance with the procedure of Example 1 were all found to be of substantially the same quality as the printed reproductions of that example.

EXAMPLE 6

Example 1 was repeated except that the formed, dried and hardened mat was laid out flat and affixed to a table top with the imaged side facing upward. A frame was disposed around the edges of the mat to form a rectangular mold extending 70 mils above the surface of the mat. Now the imaged surface of the mat (which comprised the bottom or floor of the mold thus formed) was spray coated with a thin layer of silicone release agent. Then the mold was filled with the liquid photocurable composition described in Example 1 and immediately exposed to the same lamp as in Example 1 but with no image-bearing transparency or other obstruction interposed between the lamp and the surface of the photocurable composition. This non-image-wise exposure was carried out over a period of 5 minutes. Then the thus formed plastic duplicate printing plate was peeled out of the mat. Printing using this plastic duplicate plate provided high quality reproductions having sharp resolution in both the half-tone areas and line areas and was found to be especially valuable for color printing applications.

It is to be understood that the above description is given merely by way of illustration and that many variations may be made therein without departing from the spirit of this invention.

What is claimed is:

1. In a method for preparing printing plates using a photocured plate formed of a photocurable composition having a polyene component containing at least 2 reactive unsaturated carbon-to-carbon bonds per molecule, a polythiol containing at least 2 reactive thiol groups per molecule with the sum of the reactive polyene and polythiol groups being greater than 4, and a photosensitizer the improvement which consists of molding mats from the photocured plate which is characterized by a hardness of at least about 80 on the Shore A scale, and thereafter casting or molding printing plates directly from the molded mats.

2. The method of claim 1 wherein the hardness is about 85 on the Shore A scale.

References Cited

UNITED STATES PATENTS 3,055,758   9/1962   McDonald _____ 96—48

NORMAN G. TORCHIN, Primary Examiner

E. C. KIMLIN, Assistant Examiner

U.S. Cl. X.R.

96—115

UNITED STATES PATENT AND TRADEMARK OFFICE
CERTIFICATE OF CORRECTION

PATENT NO. : 3,666,461

DATED : May 30, 1972

INVENTOR(S) : Clifton L. Kehr, Walter R. Wszolek, Frank X. Werber

It is certified that error appears in the above-identified patent and that said Letters Patent are hereby corrected as shown below:

Column 1, line 4: change "Weber" to --Werber--.

Column 1, line 10: change "Oct. 19, 1989" to --Oct. 26, 1988--.

Signed and Sealed this

Twelfth Day of October 1976

[SEAL]

Attest:

RUTH C. MASON
Attesting Officer

C. MARSHALL DANN
Commissioner of Patents and Trademarks